United States Patent [19]

Kazlauskas

[11] 4,427,868
[45] Jan. 24, 1984

[54] MOUNTING FIXTURE FOR AN AUTOMATIC WELDING APPARATUS

[76] Inventor: Gasparas Kazlauskas, 10219 Briarwood Dr., Los Angeles, Calif. 90024

[21] Appl. No.: 344,828

[22] Filed: Feb. 1, 1982

[51] Int. Cl.³ .............................................. B23K 9/02
[52] U.S. Cl. ............................... 219/60.2; 219/125.11
[58] Field of Search ................. 219/60.2, 60 A, 60 R, 219/125.1, 125.11, 160, 137 R

[56] References Cited

U.S. PATENT DOCUMENTS

| | | | |
|---|---|---|---|
| 3,513,286 | 5/1970 | Puls | 219/60.2 |
| 4,262,187 | 4/1981 | Savor | 219/60.2 |
| 4,327,269 | 4/1982 | Glatthorn | 219/60.2 |

*Primary Examiner*—B. A. Reynolds
*Assistant Examiner*—Catherine Sigda
*Attorney, Agent, or Firm*—Jack C. Munro

[57] ABSTRACT

A mounting fixture for an automatic welding apparatus for precisely centering the rotating welding electrode within the welding area. The mounting fixture is mounted onto a portion of the workpiece adjacent the welding area. An indexing device is connected to the welding fixture housing which is to determine the precise location for the welding electrode. The mounting fixture is to be movable a limited amount determined by the position of the indexing device. Once the precise position of the indexing device and the mounting fixture has been obtained, the mounting fixture is fixed with respect to the workpiece. An automatic welding head is then mounted on the mounting fixture and the now precisely located welding electrode is then to be utilized to produce the desired weld.

17 Claims, 10 Drawing Figures

MOUNTING FIXTURE FOR AN AUTOMATIC WELDING APPARATUS

BACKGROUND OF THE INVENTION

The field of this invention relates to welding equipment and more particularly to a mounting fixture for precisely locating of an automatic welding apparatus in order to obtin the highest quality weld.

In certain applications, there are manufactured parts that require internal welding. An example of such a part is a heat exchanger which is used in nuclear applications. This heat exchanger is constructed of a mass of closely spaced metallic tubes. These tubes terminate at one end at a metal sheet. Each tube connects with appropriate openings formed within the metal sheet. The point of connection of each tube to the sheet is precisely determined. The tubes may or may not be evenly spaced apart. The tubes are arranged in rows, with there normally not being the same number of tubes within each row. The location of the tubes within each row is determined from a drawing. Each tube must then be welded to the sheet, with the weld being performed within each opening in the sheet.

In order to achieve a high quality weld, an automatic welding head is utilized. Manual welding is not feasible, since there will normally be several hundred in number of tubes connected to a single sheet. The welding electrode of the automatic welding head must be centered at the precise center point within each opening during the performing of the weld. It has been common to mount the welding head onto a separate mounting strip. There is prefabricated a separate mounting strip for each horizontal row of openings. Each mounting strip includes a series of notches, with each notch to correspond to the center of an opening. Therefore, allegedly, the attaching of the welding head onto the strip at a particular notch is to result in the welding electrode being located at the exact center point of an opening. Therefore, rotation of the welding head will be precisely concentric with the wall of the opening. This means that the welding electrode will continuously remain at the same distance from the wall of the opening as the welding electrode is moved three hundred and sixty degrees around the wall of the opening during the welding of the tube to the sheet. It is to be noted that the diameter of each tube is identical so that the welding head need only be initially preset for a particular diameter.

Each notched strip is manufacturered from a drawing. The location of each opening within the sheet (as previously mentioned) is also determined from a drawing. If there are absolutely no errors in the locating of each opening and the locating of each notch, then the position of the welding head at each notch will result in a precisely centered welding electrode within an opening. However, errors are known to occur and it only takes an error in the matter of a few thousandths of an inch to result in the welding electrode not being accurately centered within an opening. Also, frequently when an error occurs within one opening, the subsequent openings in a given row are subjected to the same error. An error of just a few thousands of an inch will result in the producing of a poor quality weld within a opening.

SUMMARY OF THE INVENTION

The primary objective of this invention is to construct a mounting apparatus for an automatic welding head wherein the welding electrode of a welding head is precisely mounted at the center point of each tubular opening within a mass of such openings.

Another objective of this invention is to eliminate the need for welding head mounting strips that must now be fabricated for each row of openings.

Another objective of this invention is to construct the mounting apparatus wherein the welding head can be quickly and easily positioned for the obtaining of a weld and can be quickly and easily moved to obtain each subsequent weld.

The mounting fixture of the present invention takes the form of a housing upon which a frame is pivotally mounted. This frame is movable between an indexing position and a storage or inoperative position. Attached to the outer end of the frame is an indexing protuberance. The automatic welding apparatus is to be readily connectable to and readily removable from the housing. With the welding head mounted on the housing, the precise center point of the welding electrode is in alignment with the center of the indexing protuberance when in the indexing position. With the welding head disengaged from the mounting fixture, the indexing protuberance is centrally disposed within a particular opening. Extending from the housing are a pair of spaced-apart, elongated members each of which is to be located within a separate opening in substantially a close fitting manner. The housing is capable of a limited amount of movement with respect to the elongated members. Therefore, the housing can be accurately positioned with respect to the opening within which is located the indexing protuberance regardless of the exact position of the openings within which the elongated members are located. The housing includes a fluid operated piston. The piston is actuated by fluid pressure which causes expanding of a series of balls mounted within each elongated member to tightly engage with the side wall of the respective opening within which each elongated member is located. The fluid pressure also causes fixing the position of each elongated member in respect to the housing. At this time, a rigid connection is established between the housing, the indexing protuberance and the elongated members. The frame is then pivoted to the inoperative position. The automatic welding head is then mounted on the housing which will now automatically locate the welding electrode at the center point of the opening within which had previously been located the indexing protuberance. The desired welding of the tube to the sheet is now completed. After the completing of the weld, the automatic welding head is removed, the fluid pressure deactivated permitting the mounting fixture to be moved to another position and the sequence repeated.

DETAILED DESCRIPTION OF THE SHOWN EMBODIMENT

Figure 1:
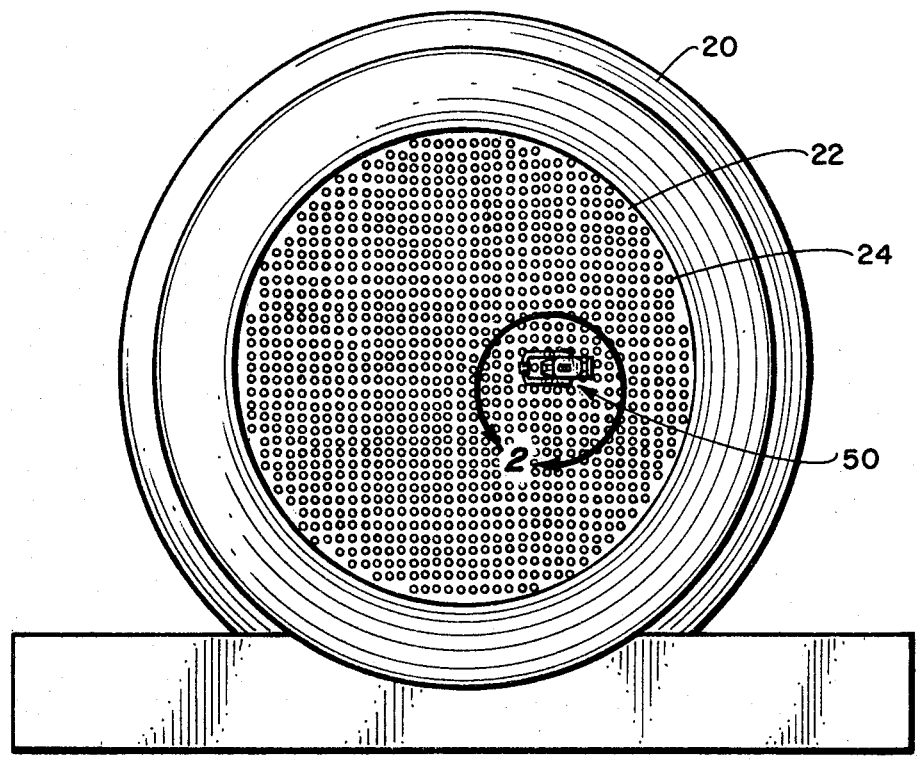
FIG. 1 is a front elevational view showing a typical environment wherein the mounting fixture of the present invention could be utilized most advantageously.
Figure 5:
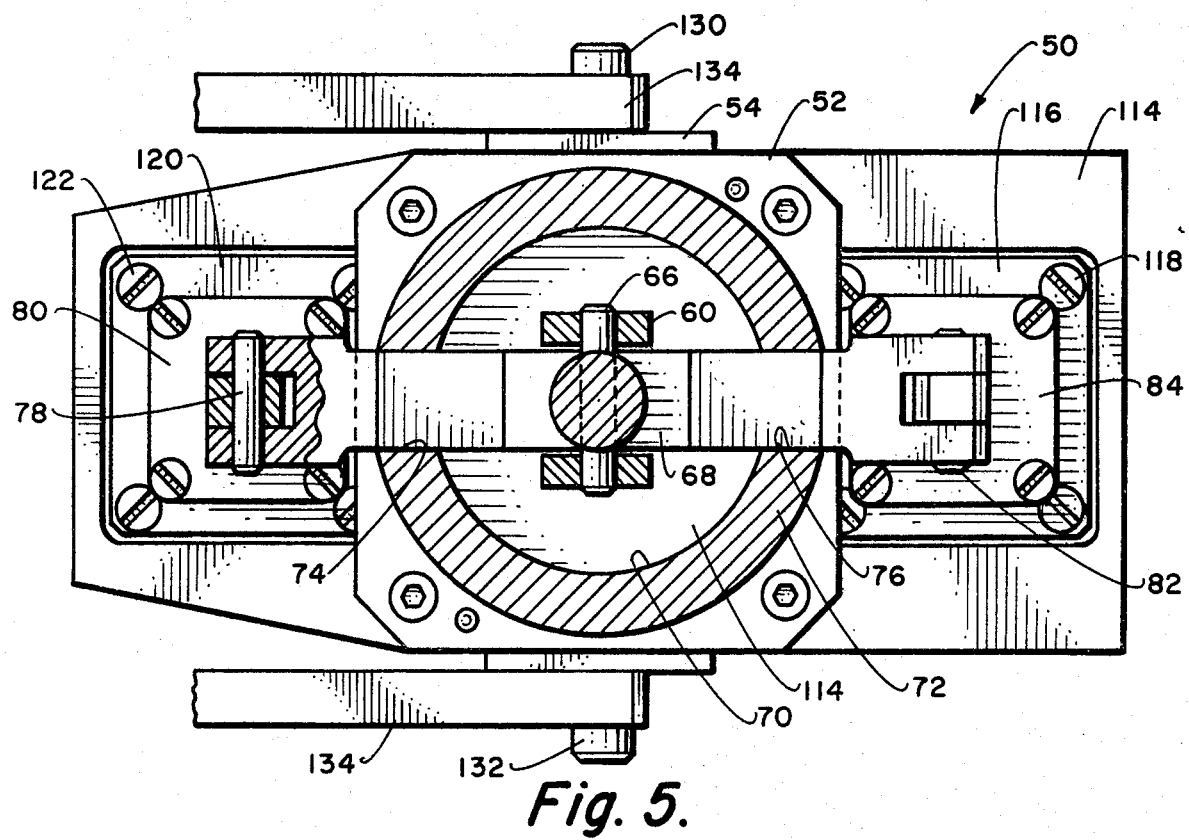
FIG. 5 is a view partly-in-cross-section through the mounting fixture of this invention taken along line 5—5 of FIG. 3.
Figure 2:
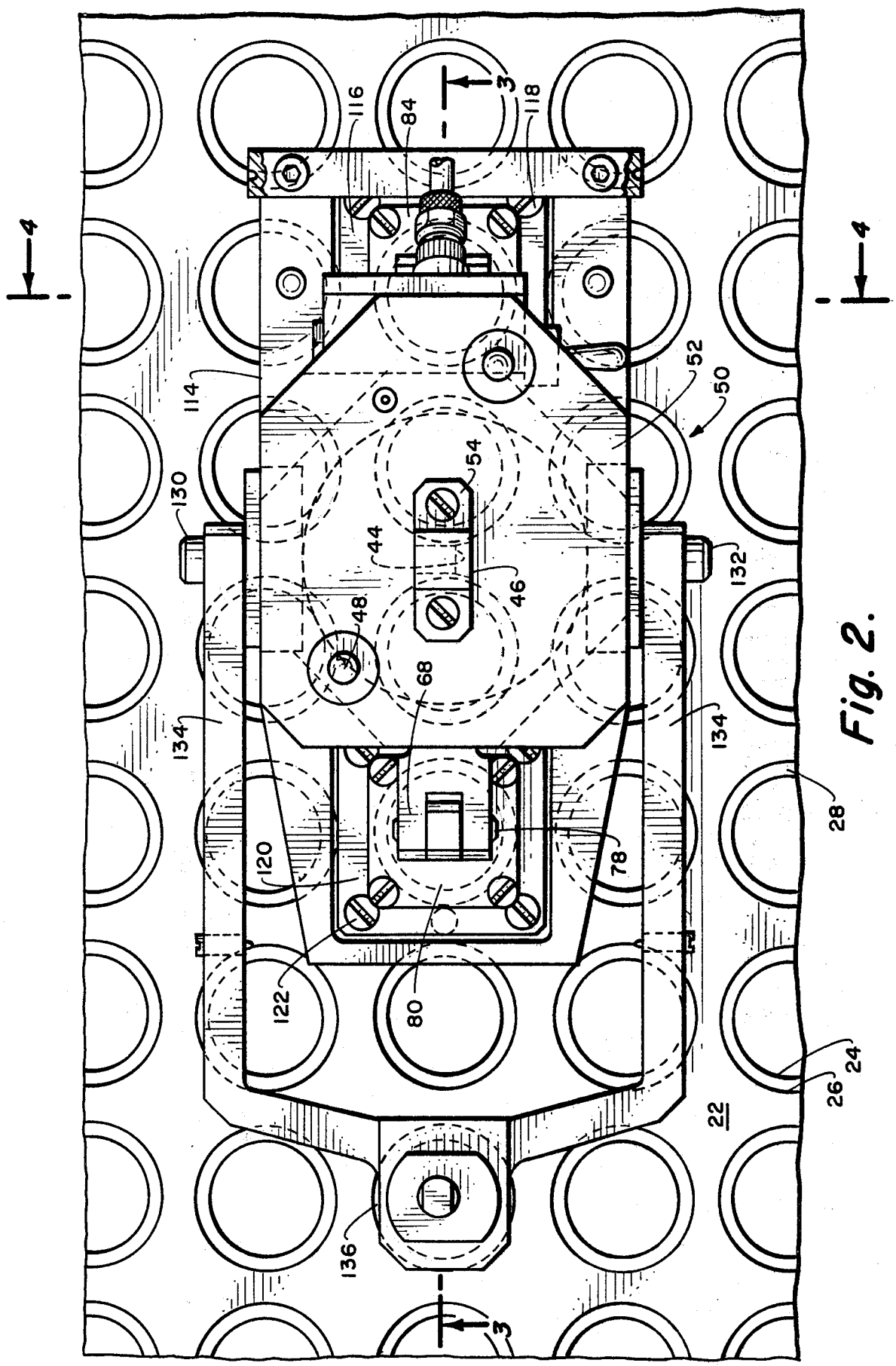
FIG. 2 is a top, plan view of the mounting fixture of this invention taken along line 2—2 of FIG. 1.

Referring particularly to FIG. 1 of the drawings, there is shown a workpiece 20 which has a sheet face 22 which includes a plurality of closely spaced-apart openings 24. It is to be noted that there are a large number of the openings 24. The openings 24 are shown to be of the same diameter. The space between the openings 24 may be substantially equal, or may be slightly different. In any event, if the spacing is different, it will vary by no more than a few thousandths of an inch.

The sheet face 22 is to be formed of a metal material, such as stainless steel or the like. Within the sheet face 22 there are formed a mass of holes 26. The location of the holes 26 is quite precise. Within each hole 26 there is located a tube 28. Each of the tubes 28 are substantially identical to each other and are of a metallic metal such as stainless steel. The outer end of each of the tubes 28 is to be located almost flush with the exterior surface of the sheet face 22. The end result, utilizing the structure of this invention, is to weld the outer end of each of the tubes 28 to the sheet face 22 forming a weld bead 30. This weld bead 30 is produced by welding electrode 32. At the time of initiating of the welding procedure, the welding electrode 32 is in direct alignment with the longitudinal center axis of the tube 28 which is being welded to the sheet face 22.

The welding electrode 32 is operated from an automatic welding head assembly 34. The head assembly 34 is deemed, by itself, to be basically conventional and it is not necessary to supply a detailed description of the welding head assembly. Broadly, it is to be made apparent that the welding head assembly 34 rotates the welding electrode 32 by welding electrode support bracket 36. This rotation is to be three hundred and sixty degrees, which is necessary in order to produce the ring-shaped welding bead 30. The important aspect of the present invention is that each time the welding electrode 32 is placed within an opening 24, the welding electrode 32 is precisely in-line with the longitudinal center axis of the opening 24. This means that as the welding electrode 32 is rotated, the electrode 32 will remain precisely the same distance at all times during the rotation from the wall of the opening 24.

The welding head assembly 34 does include an attaching surface 38. Within this attaching surface 38 is formed a polygonal shaped recess (not shown) and a smaller cylindrical shaped recess 40. A threaded rod, which is rotatable by means of knob 42, connects with the polygonal shaped recess. Turning of the knob 42 is to move the threaded rod into tight connection with hole 44 formed with a polygonal shaped plug 46. Cylindrical recess 40 connects with pin 48. The use of the pin 48 and the plug 46 are for the purpose of fixedly locating the welding head assembly 34 at exactly the same position on mounting fixture 50. The mounting fixture 50 will now be described in detail and constitutes the structure of this invention.

The pin 48 is fixedly mounted within the mounting fixture housing 52. The plug 46 is integrally formed as part of a plate 54 which is attached by conventional bolt fasteners to the housing 52.

Located within the housing 52 is an enlarged chamber 56. Movably mounted within the chamber 56 is a piston 58. Extending through the piston 58 is a piston rod 60. The upper end of the piston rod 60 is slidably mounted within a sleeve 62. The lower end of the piston rod 60 is conducted through closing wall 64, which is part of the housing 52. This lower end portion of the piston rod 60 is connected through a pivot pin 66 to a cross member 68. This connection to the cross member 68 is approximately at its longitudinal mid-point. It is to be noted that the portion of the piston rod 60 is bifurcated at its connection to the cross member 68.

The main portion of the cross member 68 is located within a chamber 70 formed within the housing 52. Chamber 70 is substantially cylindrical and formed within wall 72, which is again part of the housing 52.

Within the wall 52 there are located diametrically opposite openings 74 and 76. The cross member 68 extends through the openings 74 and 76. The width of the openings 74 and 76 is just slightly greater than the width of the cross member 68. As a result, the cross member 68 is permitted to move along a line which is parallel to the plane of the drawing. Lateral movement of the cross member 68 is prevented. This movement is due to mounting means which is now to be described.

One end of the cross member 68 is connected through pin 78 to a pad housing 80. Similarly, the other end of the cross member 68 is connected by a pin 82 to a pad housing 84.

The pad housing 84 includes an internal chamber 86. Fixedly mounted to the wall of the internal chamber 86 is a friction pad 88. The pad 88 can be constructed of either a synthetic material or a metallic material, or compositions thereof. The pad 88 is to connect with plate 90. The plate 90 is integrally formed to the upper end of a spool 92.

It is to be understood that there will a friction pad similar to pad 88 located within an internal chamber (not shown) formed within the pad housing 80. Also, this particular friction pad is to connect with a plate 90 formed at the inner end of a spool 94.

The spool 92 passes through an opening 96 formed within the lower edge of the housing 84. A similar opening is formed within the housing 80 for the conducting of the spool (not shown) therethrough. The portion of the housing 84 located around the opening 96 is normally spaced from the plate 90, but is capable of contacting plate 90.

The spool 92 is slidably mounted within a cover 98. Mounted within appropriate openings formed within the cover 98 are a plurality of spaced-apart balls 100. It is to be understood that the spool (not shown), which is located within the housing 80 is similarly slidably mounted within a cover 102. Also within the cover 102 are mounted a plurality of spaced-apart balls 104.

For purposes of describing the invention, the combination of the balls 100, the cover 98 and the spool 92 form a single elongated member. A similar combination, which includes balls 104, the cover 102, as well as the spool (not shown) form another elongated member. Both elongated members are generally referred to as a mandrel assembly.

The spool 92 includes smaller diametered sections 106 and 108. The upper edge of the sections 106 and 108 each include an annular cam surface. It can be seen that downward movement of the spool 92 causes the balls 100 to be moved exteriorly outward a short distance from the exterior surface of the cover 98. A similar occurrence is to occur with respect to the balls 104.

The cover 98 has formed at its upper end thereof an annular flange 110. A similar flange (not shown) is attached on the cover 102. The flange 110 rides within oversized annular recess 112. The recess 112 is formed within plate 114 which is formed as part of the housing 52. The flange 110 is permitted to move within the oversized annular recess 112 but is prevented from being displaced therefrom by means of confining plate 116. Plate 116 is mounted by conventional fasteners 118 on the plate 114. A similar confining plate 120 secured by fasteners 122 is associated with the cover 102, with the fasteners 122 again being secured to the plate 114.

Pressurized fluid from a source (not shown) is to be conducted through conduit 124 to a valve chamber 126 mounted within housing 52. Mounted within the valve chamber 126 is to be an appropriate valve assembly (not shown) which is deemed to be conventional and forms no specific part of this invention. The valve assembly is to be manually movable by an appropriate switching mechanism which is partially shown by handle 128 to operate the valve assembly. The operation of the valve assembly is to optionally conduct air pressure against the upper side of the piston 58, or to the lower side of the piston 58.

Figure 3:
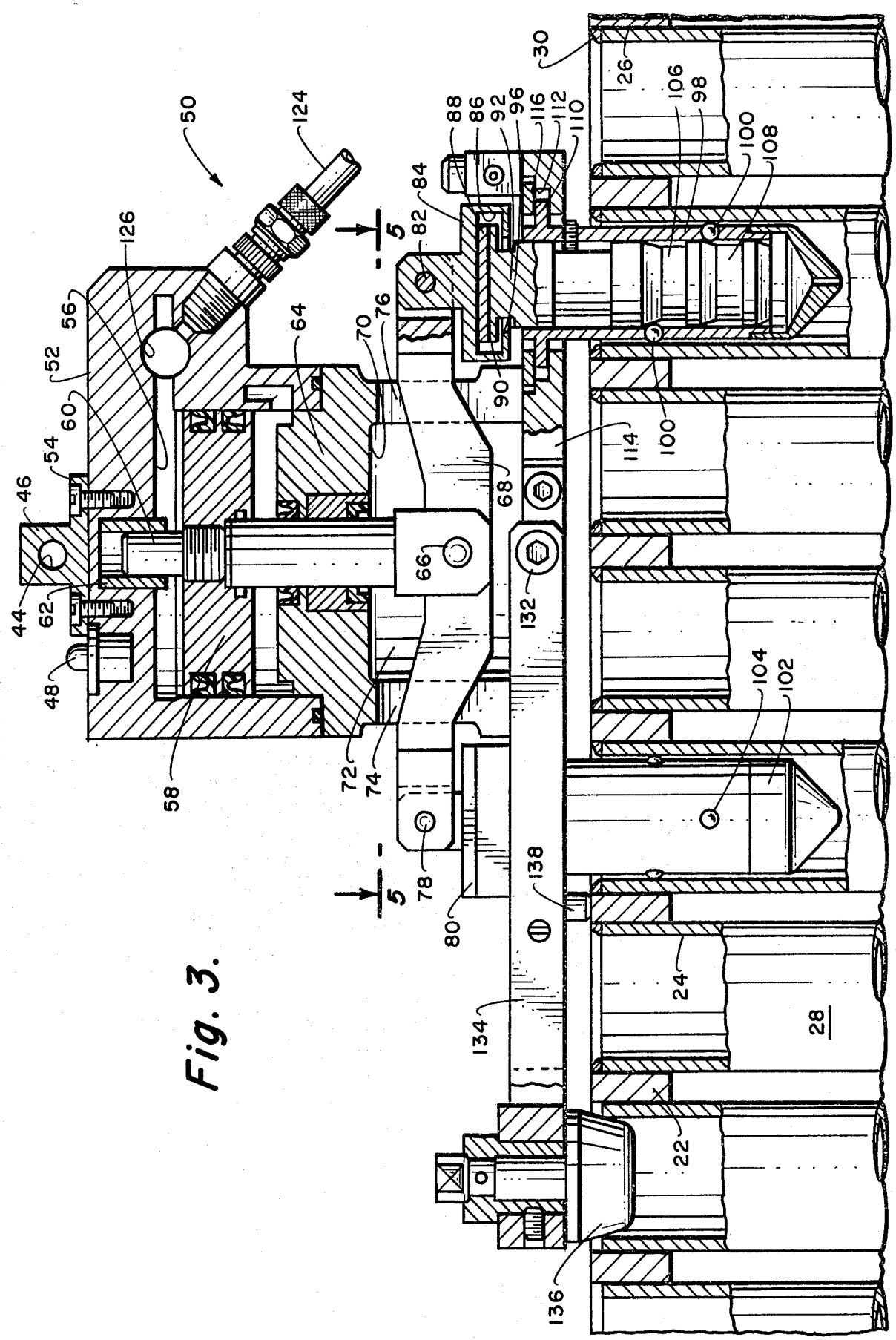
FIG. 3 is a cross-sectional view of the mounting fixture of this invention taken along line 3—3 of FIG. 2.
Figure 4:
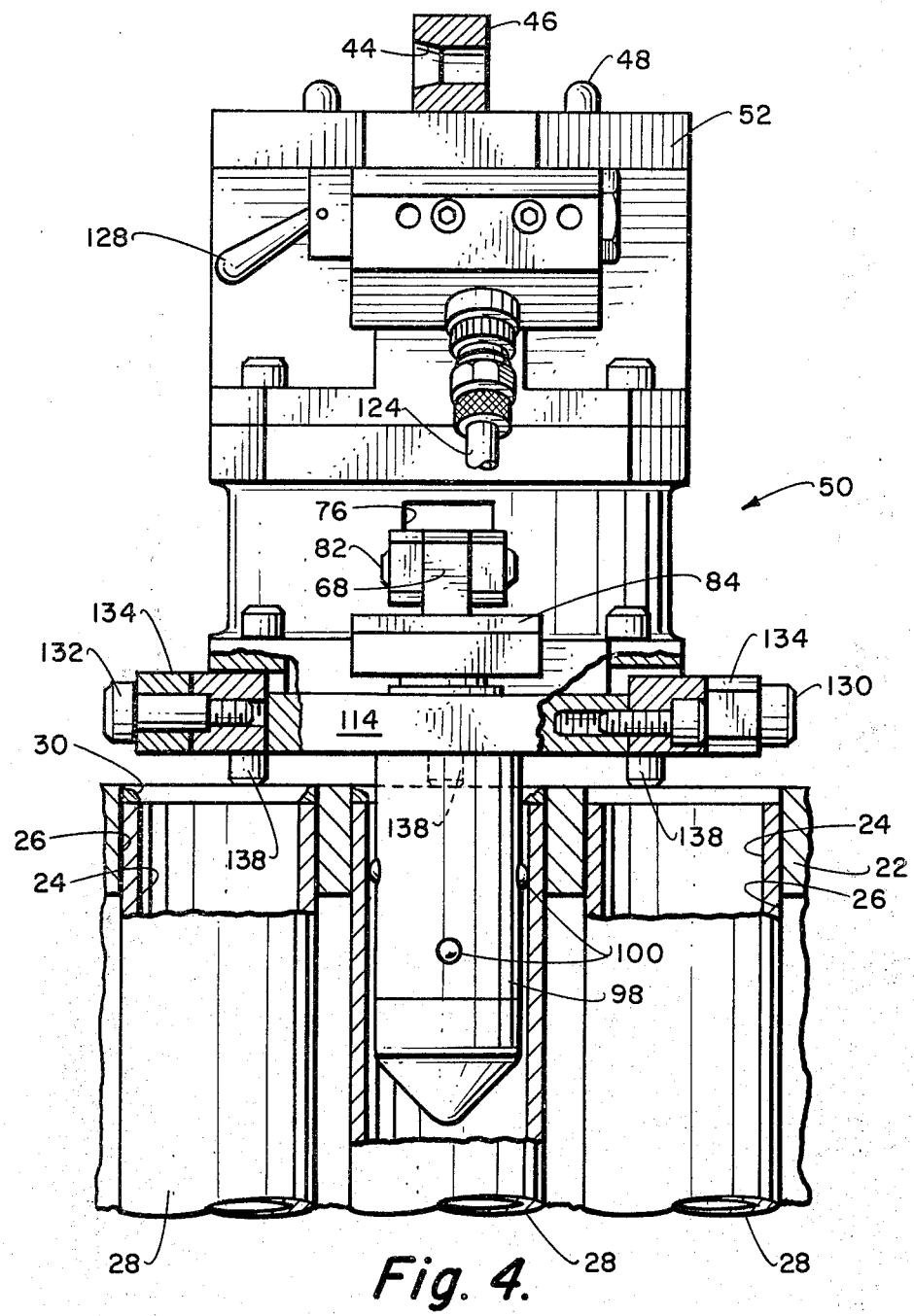
FIG. 4 is a view partly-in-cross-section through one of the elongated members utilized within the mounting fixture of this invention taken along line 4—4 of FIG. 2.
Figure 6:
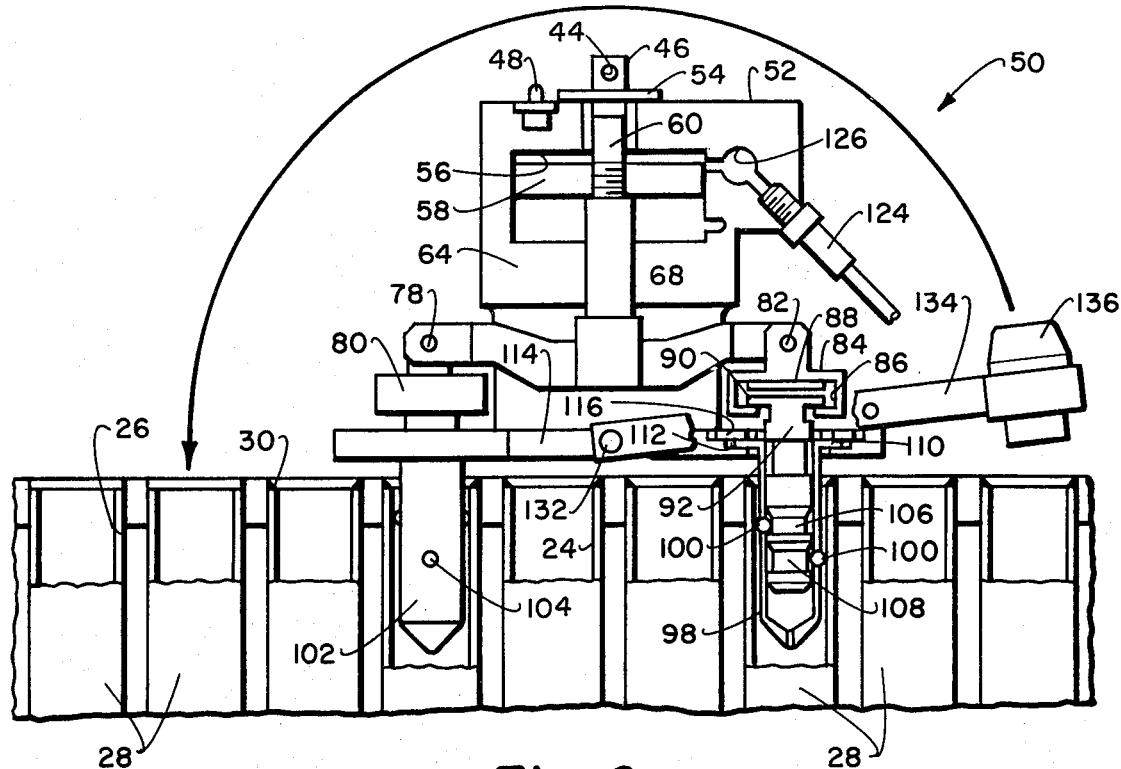
FIG. 6 is a diagramatic view of the mounting fixture of this invention shown mounted on the workpiece, but with the indexing device located in the storage (inoperative) position.
Figure 7:
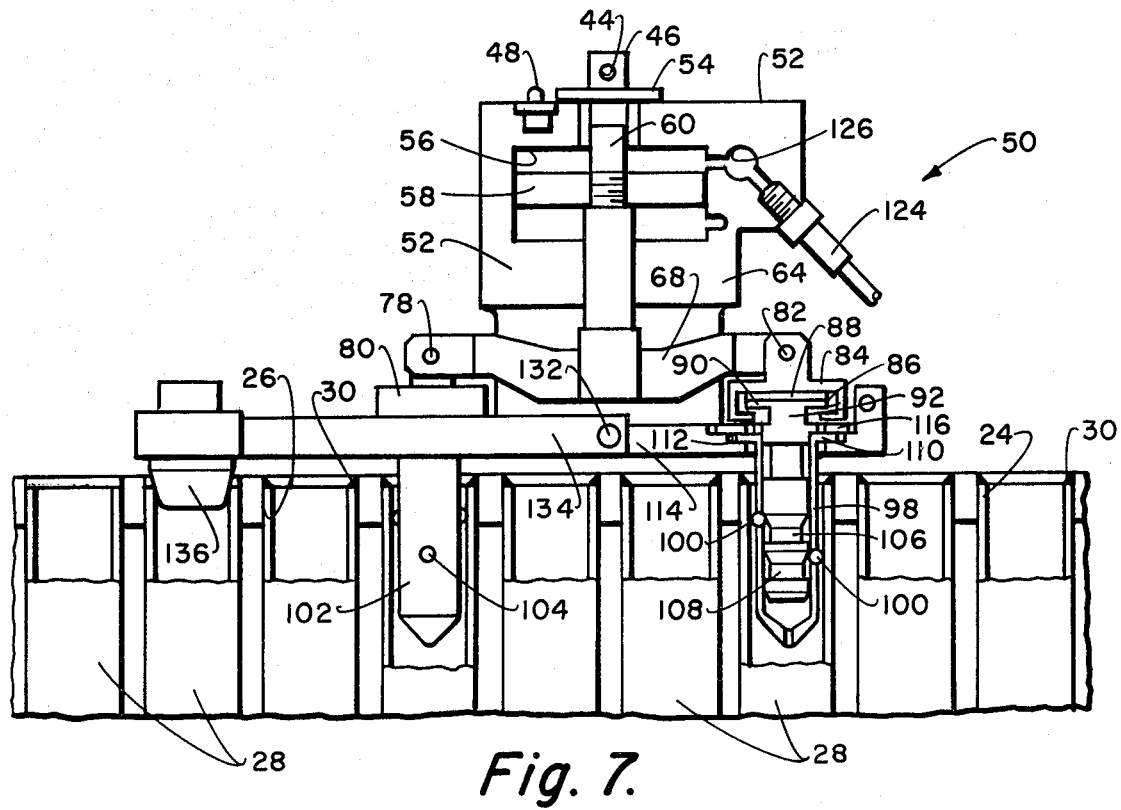
FIG. 7 is a view similar to FIG. 6 but showing the indexing device in the indexing position.
Figure 8:
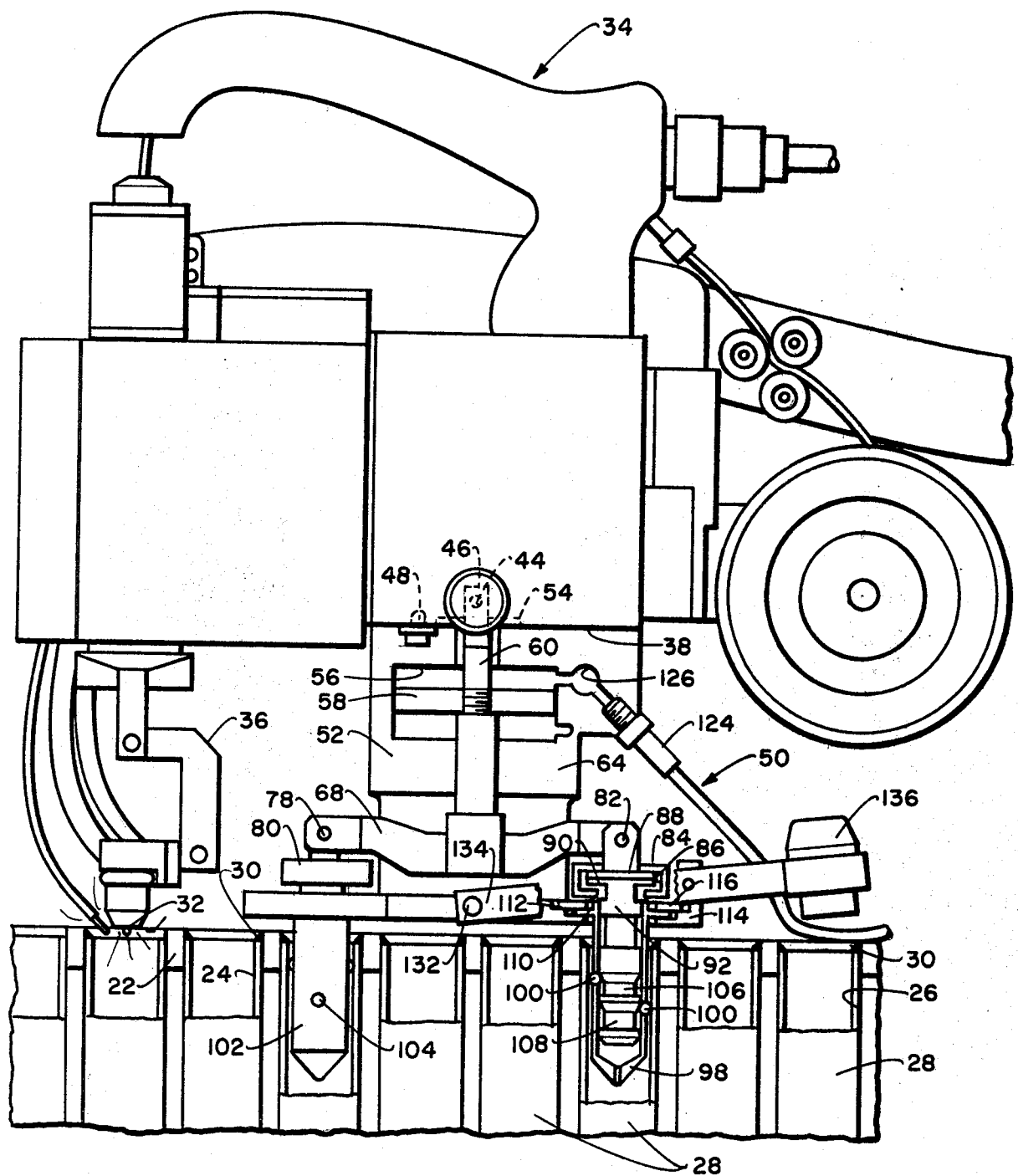
FIG. 8 is a view similar to FIG. 7 but showing the welding head being mounted on the mounting fixture and welding.
Figure 9:
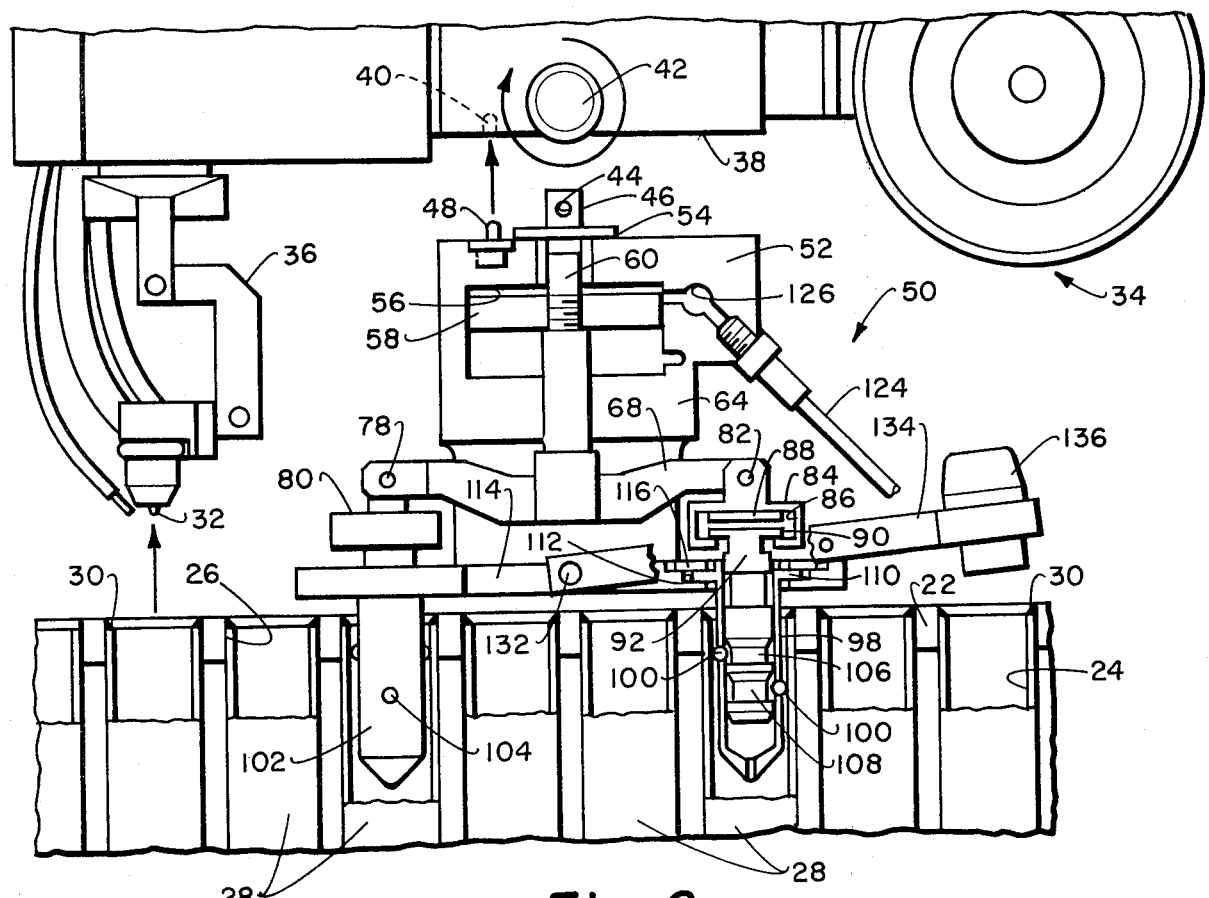
FIG. 9 is a view similar to FIG. 8 showing the welding head being disengaged from the mounting fixture.
Figure 10:
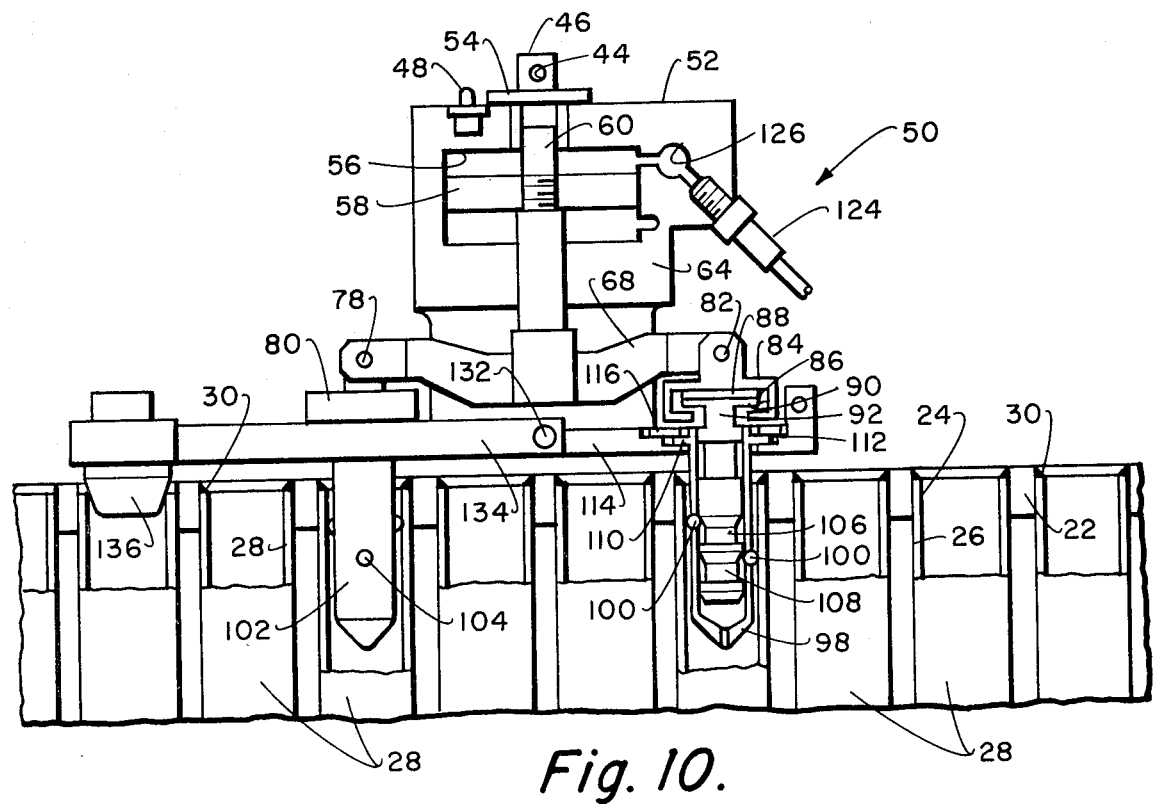
FIG. 10 is a view similar to FIG. 7 but showing the mounting fixture having been relocated with the indexing device positioned within the next succeeding opening in order to repeat the welding procedure.

Pivotally mounted to the plate 114 by means of pins 130 and 132 is a bifurcated frame 134. It is to be noted that the pivot axis represented by pins 132 and 130 intersects the longitudinal center axis of the piston rod 60. The frame 134, in its pivoting movement, is to be conducted over the housing 52. The frame 134 is to be movable from an indexing position shown in FIG. 3 substantially one hundred and eighty degrees to an inoperative or storage position shown in FIG. 6. This movement, of course, occurs only when the welding head assembly is disassociated from the mounting fixture 50.

The outermost section of the frame 134 is connected together and has fixedly secured thereto a indexing protuberance 136.

It is to be noted that the plate 114 rests a slightly spaced distance from sheet face 22. Mounted on to the undersurface of the plate 114 at appropriate locations are a plurality of small pins 138, which function as feet to rest against the solid areas of the sheet face 22 to achieve the desired spacing.

The operation of the mounting fixture 50 of this invention is as follows: The operator initially determines which opening 24 it is desired to weld the tube 28 to the sheet face 22. The mounting fixture 50 is grasped (not attached to the welding head assembly 34) and the covers 98 and 102 are placed within appropriate openings 104 so that the protuberance 136 will connect with the desired opening 24 to be welded. The operator then grasps frame 134 and pivots such until the protuberance 136 is snugly centered within the appropriate opening 24. The air pressure is then being supplied to the lower side of the piston 58. The pressure being supplied to the lower side of the piston 58 has caused the elongated member 68 to be moved to its uppermost position and the portion of the pad housing 84 located around the opening 96 is in contact with plate 90. There is a space created between the friction pad 88 and the plate 90 and the balls 100 are pushed inward connecting fully with the smaller diametered sections 108 and 110. It is to be understood that the balls 104 are located in the same position with respect to its spool (not shown).

With the indexing protuberance 136 snugly in position within the appropriate openings, the operator then moves handle 128, to cause the pressurized air to not be conducted to the lower side of the piston 58, but instead to the upper side of the piston 58. This causes the piston rod 60 to move in the downward direction, which in turn causes the cross member 68 to move in the downward direction. This downward direction movement causes friction pad 88 to come into contact with the plate 90 and move the spool 92 in the downward direction resulting in the balls 100 being pushed outward in tight contact with the wall of the tube 28 within which it is located. The same procedure occurs with respect to the balls 100. Because the balls 100 and 104 are evenly distributed about their respective cover 98 and 102, the covers 98 and 102 become centered within their respective opening 24. During this centering, the covers 98 and 102 can move a limited distance laterally with respect to the plate 114. The plate 114 remains fixed in position, since the indexing protuberance 136 is fixed in position, as well as the frame 134.

Almost instantaneously after the centering has been obtained, further downward movement of the piston rod 60 causes a tight engagement to occur between the friction pad 88 and the plate 90 thereby now fixedly positioning the spool 92 and its cover 98 (as well as cover 102) with respect to the housing 52. The applying of the pressurized air to the upper surface of the piston 58 is maintained. The operator then proceeds to pivot the frame 134 to the storage position and the welding head assembly 34 is installed as previously described onto the mounting fixture 50. The desired welding procedure is then completed, producing of the weld bead 30 and then the welding head assembly 34 is removed from the mounting fixture 50. The air pressure applied to the upper side of the piston 58 is then reversed to the lower side of the piston 58 which disengages the balls 100 and 104 from tight engagement from the wall surfaces of their respective tubes 28. The mounting fixture 50 is then moved to another appropriate location and the procedure repeated.

What is claimed is:

1. A mounting fixture for an automatic welding apparatus for welding tubes to a tubesheet comprising:
  a housing;
  a mandrel assembly mounted by mounting means on said housing, said mandrel assembly including engaging means for tightly connecting with a fixed structure, said mounting means permitting limited movement of said housing relative to said mandrel assembly along a line parallel to the surface of said tubesheet
  indexing means attached to said housing, said indexing means to connect with a portion of said tubesheet, said indexing means to ascertain the center of said portion and position said housing a precise distance from said center which causes said housing to move by said mounting means within the confines of said limited movement in respect to said mandrel assembly; and position fixing means actuatable to fix together said housing and said mandrel assembly the position of which has been established by said indexing means, said position fixing means to be releasable to permit relative movement between said housing and said mandrel assembly.

2. The mounting fixture as defined in claim 1 wherein: said engaging means comprises expanding means, said expanding means to be actuatable to be expanded into tight connection with said fixed structure.

3. The mounting fixture as defined in claim 2 wherein: said expanding means comprising a ball assembly, said ball assembly being movable from a retracted non-engaging position to an extended engaging position.

4. The mounting fixture as defined in claim 3 wherein: said ball assembly comprising a plurality of spaced apart balls.

5. The mounting fixture as defined in claim 4 wherein: said tubesheet defining a mass of openings, said mandrel assembly comprising a pair of elongated members, each said elongated member to be located in a close fitting relationship within a said opening, said balls to be mounted within said elongated members.

6. The mounting fixture as defined in claim 1 wherein: said tubesheet defining a mass of openings, said housing being attached to a welding electrode, said welding electrode connecting with a first opening of said openings; and said indexing means including an enlarged protuberance, said enlarged protuberance to connect with a second opening of said openings in a substantially close fitting relationship to thereby ascertain the center of said second opening and hence correctly position said welding electrode in respect to said first opening, said second opening being spaced from said first opening.

7. The mounting fixture as defined in claim 6 wherein: said indexing means includes a frame, said frame being pivotally mounted on said housing, said frame being movable between an indexing position and storage position, said indexing position being when said enlarged protuberance connects with said second opening, said storage position being when said enlarged protuberance being disconnected and spaced from said second opening.

8. The mounting fixture as defined in claim 1 wherein: said position fixing means including a fluid operated piston, said piston being mounted within said housing, said piston being movable between a locking position and an unlocking position.

9. The mounting fixture as defined in claim 8 wherein: said mandrel assembly comprising of a pair of elongated members, said piston being connected to a cross member, said cross member having a first end and a second end, said first end being connected through first connecting means to one of said elongated members, said second end being connected through second connecting means to the other of said elongated members, both of said elongated members (due to said mounting means) being capable of limited movement in respect to its respective said end of said cross member when said piston is in said unlocking position, when said piston is in said locking position the said first and second ends of said cross member being fixed through said first and second connecting means to said elongated members.

10. The mounting fixture as defined in claim 9 wherein: said first connecting means comprising a first friction pad assembly, said second connecting means comprising a second friction pad assembly.

11. The mounting fixture as defined in claim 9 wherein said mounting means includes: said cross member being connected with lateral restraint means, said lateral restraint means being connected to said housing, said lateral restraint means permitting movement of said cross member only along said line.

12. The mounting fixture as defined in claim 11 wherein: said tubesheet defining a mass of openings, said housing being attached to a welding electrode, said welding electrode connecting with a first opening of said openings; and said indexing means including an enlarged protuberance, said enlarged protuberance to connect with a second opening of said openings in a substantially close fitting relationship to thereby ascertain the center of said second opening and hence correctly position said welding electrode in respect to said first opening, said second opening being spaced from said first opening.

13. The mounting fixture as defined in claim 12 wherein: said indexing means includes a frame, said frame being pivotally mounted on said housing, said frame being movably between an indexing position and storage position, said indexing position being when said enlarged protuberance connects with said second opening, said storage position being when said enlarged protuberance being disconnected and spaced from said second opening.

14. The mounting fixture as defined in claim 13 wherein: said engaging means comprises expanding means, said expanding means to be actuatable to be expanded into tight connection with said fixed structure.

15. The mounting fixture as defined in claim 14 wherein: said expanding means comprising a ball assembly, said ball assembly being movable from a retracted non-engaging position to an extended engaging position.

16. The mounting fixture as defined in claim 15 wherein: said ball assembly comprising a plurality of spaced apart balls.

17. The mounting fixture as defined in claim 16 wherein: said tubesheet defining a mass of openings, said mandrel assembly comprising a pair of elongated members, each said elongated member to be located in a close fitting relationship within a said opening, said balls to be mounted within said elongated members.

* * * * *